US011686822B2

(12) United States Patent
Beuschel et al.

(10) Patent No.: US 11,686,822 B2
(45) Date of Patent: Jun. 27, 2023

(54) LIDAR MEASUREMENT SYSTEM

(71) Applicant: Microvision, Inc., Redmond, WA (US)

(72) Inventors: Ralf Beuschel, Wangen (DE); Rainer Kiesel, Stetzingen (DE)

(73) Assignee: Microvision, Inc., Redmond, WA (US)

( * ) Notice: Subject to any disclaimer, the term of this patent is extended or adjusted under 35 U.S.C. 154(b) by 647 days.

(21) Appl. No.: 16/772,965

(22) PCT Filed: Nov. 16, 2018

(86) PCT No.: PCT/EP2018/081598
§ 371 (c)(1),
(2) Date: Jun. 15, 2020

(87) PCT Pub. No.: WO2019/115151
PCT Pub. Date: Jun. 20, 2019

(65) Prior Publication Data
US 2021/0080548 A1  Mar. 18, 2021

(30) Foreign Application Priority Data

Dec. 15, 2017  (DE) .......................... 102017222970.5

(51) Int. Cl.
*G01S 7/481* (2006.01)
*G01S 17/10* (2020.01)
*G01S 17/89* (2020.01)

(52) U.S. Cl.
CPC .......... *G01S 7/4815* (2013.01); *G01S 7/4816* (2013.01); *G01S 17/10* (2013.01); *G01S 17/89* (2013.01)

(58) Field of Classification Search
CPC ...... G01S 7/4815; G01S 7/4816; G01S 17/10; G01S 17/89
See application file for complete search history.

(56) References Cited

U.S. PATENT DOCUMENTS 10,795,001 B2* 10/2020 Niclass .................. G01S 17/42
10,830,879 B2* 11/2020 Niclass ................ G01S 7/4863
2010/0051836 A1   3/2010 Kim
(Continued)

FOREIGN PATENT DOCUMENTS

EP  3168641 A1  5/2017
JP  S646716 A   1/1989
(Continued)

OTHER PUBLICATIONS

Office Action for the Japanese Application No. JP2020-552103 dated Jul. 14, 2021.

*Primary Examiner* — Luke D Ratcliffe
*Assistant Examiner* — Brian Zawacki
(74) *Attorney, Agent, or Firm* — Kevin D. Wills

(57) ABSTRACT

LIDAR measurement system with a LIDAR transmitting unit and a LIDAR receiving unit, which is configured in a focal-plane-array arrangement, wherein the LIDAR receiving unit has a plurality of sensor elements and wherein the LIDAR transmitting unit has a plurality of emitter elements, wherein a plurality of sensor elements form a macrocell, wherein the macrocell is associated with a single emitter element, wherein the distance between two adjacent emitter elements is unequal to an integer multiple of the distance between two adjacent sensor elements.

19 Claims, 8 Drawing Sheets

(56) References Cited

U.S. PATENT DOCUMENTS

Figure 1:
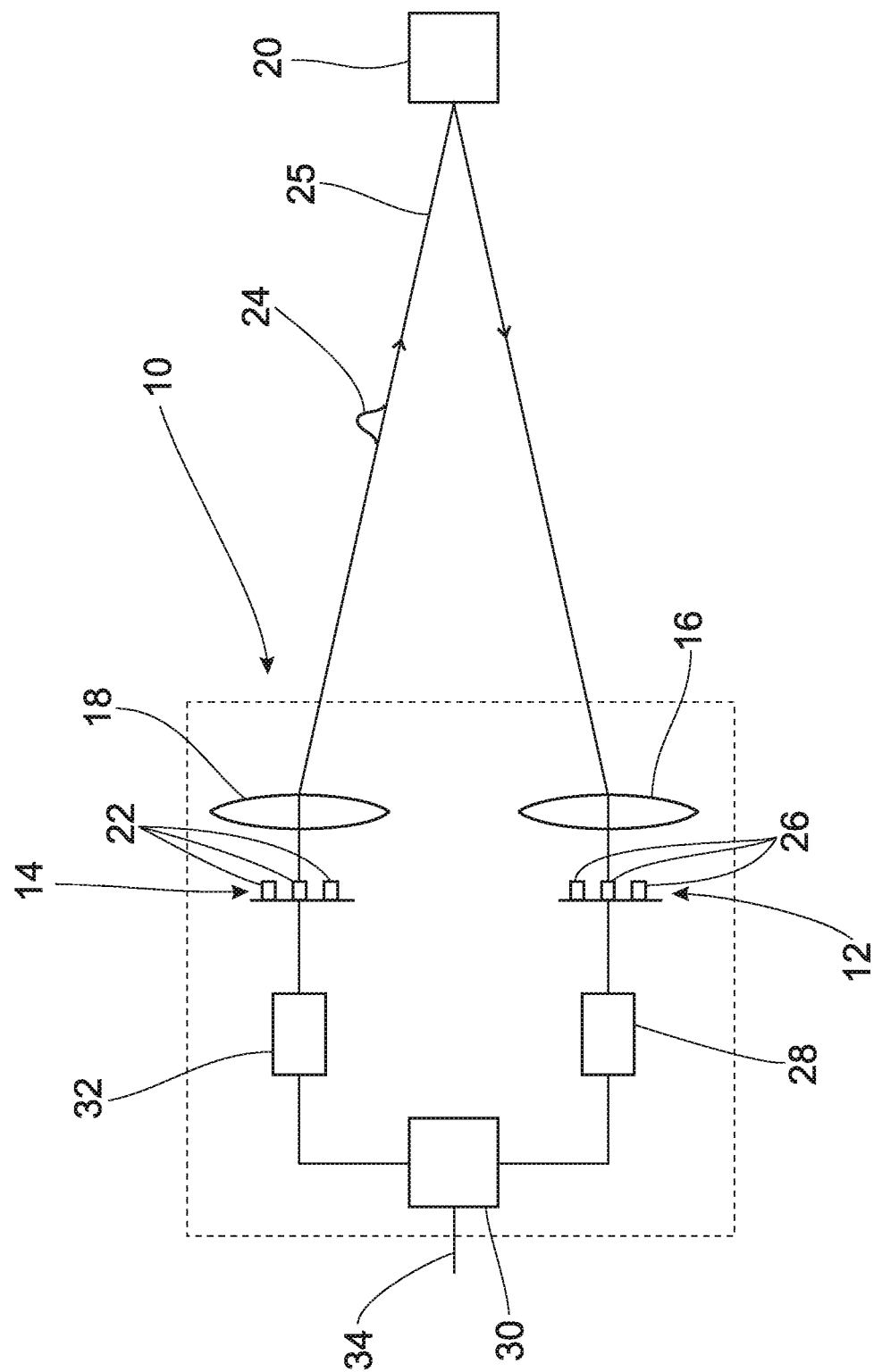

| | | | | |
|---|---|---|---|---|
| 2015/0260843 A1* | 9/2015 | Lewis | ................. | G02B 26/106 |
| | | | | 356/5.01 |
| 2016/0178991 A1 | 6/2016 | Wan et al. | | |
| 2017/0234984 A1* | 8/2017 | Khial | .................... | G01S 7/4817 |
| | | | | 356/5.1 |
| 2020/0209355 A1* | 7/2020 | Pacala | .................... | G01S 7/484 |

FOREIGN PATENT DOCUMENTS

| | | | |
|---|---|---|---|
| JP | 2009-192499 A | 8/2009 | |
| JP | 2015-227781 A | 12/2015 | |
| JP | 2016-188808 A | 11/2016 | |
| WO | 2011029645 A1 | 3/2011 | |
| WO | 2013032954 A1 | 3/2013 | |
| WO | 2014/207983 A1 | 12/2014 | |
| WO | 2017081294 A1 | 5/2017 | |
| WO | WO-2018205006 A1 * | 11/2018 | ............. G01S 17/10 |

* cited by examiner

- Prior Art -

LIDAR MEASUREMENT SYSTEM

The invention relates to a LIDAR measurement system with a LIDAR receiving unit.

A LIDAR measurement system is known from WO 2017 081 294. This LIDAR measurement system has, inter alia, a transmitting unit, a transmitting optic, a receiving optic and a receiving unit. A laser light is emitted by one or more emitter elements of the transmitting unit and scattered via the transmitting optic in different spatial directions. The laser light is then reflected on an object and guided via the receiving optic to the receiving unit. The incoming reflected laser light is detected by sensor elements. An advantage of this system is that it can be constructed in a compact fashion and is static, i.e. does not require any moveable adjustment elements for the emitter elements and the sensor elements.

The object here is to improve such a LIDAR measurement system, in particular its LIDAR receiving unit, so that an incoming laser light can be detected as optimally as possible.

This object is achieved by a LIDAR measurement system in accordance with claim 1. The subsequent dependent claims constitute advantageous embodiments.

The basic structure of the LIDAR measurement system is configured in accordance with the statements regarding the prior art. The LIDAR measurement system comprises a LIDAR transmitting unit and a LIDAR receiving unit. Furthermore, the LIDAR measurement system and its components are preferably designed to be arranged statically, i.e. in an immobile manner, on a motor vehicle. This means that the LIDAR measurement system and its components do not have any active mobility/adjustment mechanisms, for example electric motors, for the measurement process.

The LIDAR receiving unit and/or the LIDAR transmitting unit are advantageously formed in a focal-plane-array configuration. The elements of the respective units are arranged essentially in a plane, advantageously on a chip. The respective units are preferably arranged on the LIDAR measurement system at a focal point of a corresponding optic, transmitting optic, or receiving optic. In particular, the sensor elements and emitter elements are arranged at the focal point of the receiving optic. Such an optic can be, for example, formed by an optical lens system.

The LIDAR receiving unit has a plurality of sensor elements, which are preferably configured as SPADs, single-photon avalanche diodes. The LIDAR transmitting unit has a plurality of emitter elements for emitting laser light, advantageously laser pulses. The emitter elements are advantageously configured as VCSELs, vertical-cavity surface-emitting lasers.

The LIDAR receiving unit and the LIDAR transmitting unit are advantageously arranged next to one another on the LIDAR measurement system. Next to one another here implies the adjacent arrangement of LIDAR receiving unit and LIDAR transmitting unit, i.e. also one above the other or adjacent diagonally. The sensor elements and the emitter elements are advantageously arranged on a common plane. Their respective chips are thus advantageously arranged relative to one another in such a manner that the sensor elements and the emitter elements lie on the same plane. A parallel arrangement with a corresponding offset in the normal direction is also possible.

The LIDAR transmitting unit has a plurality of emitter elements, the irradiated laser light of which is irradiated via a transmitting optic into different solid angles. This means that a given solid angle is associated with each emitter element. The arrangement of the sensor elements of the LIDAR receiving unit and its receiving optic is comparable so that the receiving optic maps a given solid angle onto a given surface area of the LIDAR receiving unit.

In other words, a laser light of an emitter element emitted via the emitter optic to an object in the far field always maps via the receiving optic onto the same area on the LIDAR receiving unit. A plurality of sensor elements, which together form a macro cell, are preferably arranged in this area in which laser light is to be expected. The emitter element and such a macro cell are assigned to each other.

As a VCSEL is generally larger than a SPAD and its laser light is thus able to illuminate a plurality of sensor elements, it is also advantageous to configure a plurality of sensor elements in macro cells. Such a macro cell can be, for example, defined via the surface area onto which the emitter element can theoretically or also practically map after a reflection on an object. This surface area is called the mapping area in the following, while the area actually illuminated by the laser light, which is smaller than the mapping area, is called illumination area. The incoming laser light can be subject to a deflection due to different effects, for example optical mapping errors of the transmitting and receiving optics, a maladjustment or a front panel. The laser surface area thus maps onto an area within the mapping area. The mapping area is generally many times larger than the illumination area.

The sensor elements thus advantageously cover at least the mapping area, although during operation merely a portion of the sensor elements is actually illuminated by laser light. The sensor elements can preferably be activated and deactivated individually or in groups. Sensor elements that are not illuminated are preferably deactivated in order to reduce a detection of environmental radiation.

An electronic system is generally configured on the LIDAR measurement system for the evaluation of the detected laser light. This electronic system is, however, not described here further. For instance, a plurality of sensor elements, in particular all sensor elements of a macro cell, can be read out by means of a readout element of the electronic evaluation system so that a definition of a macro cell is available on the side of the hardware. For instance, a readout element is provided for a row of macrocells.

Optics or also optical lens systems have the effect that incoming light is subject to essentially the same mapping in adjacent areas, including potential mapping errors. This means that the incoming laser light experiences, at adjacent macro cells and in the event of a static mapping error, essentially the same deflection inside the mapping area. The deflection of the laser light at adjacent macro cells is thus correlated.

A configuration is thus proposed for the sensor elements which always allows an even illumination of the sensor elements of adjacent macrocells on statistical average regardless of potential mapping errors. The sensor elements and the emitter elements have a decorrelated arrangement.

For instance, a configuration is used consisting of four emitter elements and sixteen associated rows of sensor elements, wherein a distance between the emitter elements corresponds to a multiple of the distance between the rows of sensor elements. Since the number of rows of sensor elements corresponds to an integer multiple of the number of rows of emitter elements, each emitter element maps onto the same point inside the mapping area of the macrocell. The sensor elements of all four macrocells are thus illuminated in an identical manner, i.e. optimally or poorly.

The distance between two adjacent emitter elements is unequal to an integer multiple of the distance between two adjacent sensor elements. A decorrelated LIDAR measurement system is thus provided. It is ensured by this means that, in the event that an emitter element maps into a bad area of the macrocell, the adjacent emitter elements map in their macrocells into other, more advantageous areas. As a result, even if individual macrocells are illuminated poorly, the adjacent macrocells, however, are illuminated substantially better so that on statistical average a good illumination is achieved. A good detection is thus guaranteed by means of the LIDAR measurement system. Such a ratio can be realized, for example, in one or in more than one dimension. For instance, in the column direction or in the column direction and row direction.

Adjacent sensor elements likewise have a distance to one another that varies depending on the arrangement or decorrelated arrangement between emitter elements and sensor elements. A distance between adjacent sensor elements can be different in the column direction and in the row direction. Advantageously, the distance between adjacent sensor elements is the same in all directions. In a further preferred embodiment, the distance between adjacent sensor elements in the row direction is smaller than in the column direction. The row direction advantageously points from the LIDAR transmitting unit to the LIDAR receiving unit.

In an advantageous embodiment, it is proposed to arrange the emitter elements and the macrocells respectively apart in a row-column arrangement and wherein the sensor elements are likewise arranged in a kind of row-column arrangement.

This essentially corresponds to the division of macrocells and emitter elements outlined above, the latter illuminating or observing via their respective optics a corresponding solid angle. In other words, the arrangements of the macrocells and emitter elements on their respective units are identical. The arrangement of the sensor elements in the same or in a similar type of row-column arrangement is particularly advantageous. The possible types of row-column arrangements will be described in greater detail below.

The distance between two adjacent emitter elements, in particular adjacent in the row direction, is advantageously unequal to an integer multiple of the distance between two adjacent rows of sensor elements.

A LIDAR measurement system in accordance with claim 3 is further proposed, which likewise achieves the object formulated in the introduction. The dependent claims constitute advantageous embodiments.

The previous statements regarding claims 1 and 2 are applicable to this LIDAR measurement system in an identical manner.

Here, the common number of rows of sensor elements of a plurality of adjacent macrocells is unequal to the integer multiple of the associated emitter elements. This means that at least two emitter elements and their associated macrocells are considered. The macrocells have a plurality of sensor elements, which are arranged in a plurality of rows. Besides the arrangement in rows, the sensor elements are also advantageously arranged in columns, wherein per row two, three, four or more sensor elements are arranged.

The number of all rows of these macro elements is unequal to an integer multiple of the rows of macro elements here. By means of such an arrangement, a corresponding identical repetition can be avoided, i.e. a mapping of two adjacent emitter elements onto the associated macrocells with their sensor elements onto an identical poor position, as described above. For instance, four emitter elements with their macrocells are used, while the number of rows of sensor elements of the macrocells has the value eighteen. This way, a mapping of an emitter element onto a macrocell is repeated as of the fourth microcell in an identical manner provided that a theoretically perfect mapping is assumed or the optics map into spatially adjacent macrocells with the same optical errors. If an emitter element maps onto a bad point on the macrocell, at least the other three emitter elements map onto another, better point.

A further LIDAR measurement system in accordance with claim 4 is further proposed. The dependent claims represent advantageous embodiments of the LIDAR measurement system.

The previous statements regarding claims 1, 2 and 3 are applicable to this LIDAR measurement system in an identical manner. The different LIDAR measurement systems accordingly exhibit a large amount of technical and feature-related overlap.

If there is a number of rows of N emitter elements and of the associated N macrocells, the number of rows of sensor elements of the N macrocells is determined by $(m \cdot N)+k$, wherein m is an integer and k is an integer between 1 and $N-1$. The number m and the number k can be chosen freely.

Advantageous embodiments of the LIDAR measurement system are explained in the following.

A distance, for example in the form of one or more empty rows of sensor elements, can be formed between two macrocells particularly advantageously. These can be counted or not counted as necessary in the event of an arrangement by row or in accordance with the variants described above. A corresponding empty row can be wider or narrower than a row that has sensor elements. This means that the width of the empty row can be configured to be larger or smaller than the distance between two adjacent sensor elements.

It is further proposed that adjacent sensor elements of odd order have an offset and adjacent sensor elements of even order have no offset.

An element, i.e. a sensor element or emitter element, has a direct neighbour, which is the neighbour of first order. The element following this neighbour corresponds to the neighbour of second order, whereupon the subsequent element corresponds to the neighbour of third order, etc. The neighbourhood here advantageously relates to row-wise adjacency or column-wise adjacency. In other words, this means that a sensor element has an offset in relation to its neighbour, the offset being cancelled in relation to the subsequent sensor element. Adjacent elements in the row direction are advantageously offset in the column direction, while adjacent elements in the column direction are advantageously offset in relation to one another in the row direction.

In an alternative variant, the offset is added row by row or column by column. Moreover, the value of the offset can vary from row to row or from column to column. The forms of the rows and columns thus allow not only a rectangular pattern, but also other pattern shapes such as, for example, a diamond shape or a hexagonal shape.

Sensor elements adjacent in the column direction advantageously have an offset pointing in the row direction.

Sensor elements adjacent in the row direction particularly advantageously have an offset in the column direction.

By means of such an offset of adjacent sensor elements in the orthogonal direction, an improved covering is achieved on the chip. In particular, a particularly high detector surface area per chip surface area is achieved with hexagon-shaped sensor elements.

Desirable values for an offset are, for example, ⅓ or ½ of the distance between the sensor elements.

In an advantageous embodiment, the sensor elements are configured to be circular, square or hexagonal.

A circular as well as a square design of the sensor elements is advantageous from a manufacturing point of view in particular for SPADs. In contrast, a relatively large detector surface area is achieved by using hexagonal sensor elements. The sensor elements, in particular SPADs, are advantageously rounded at the corners.

The columns of emitter elements of the LIDAR transmitting unit and the columns of sensor elements of the LIDAR receiving unit particularly advantageously have an angle α relative to one another or are configured so as to be parallel to one another.

In the case of a parallel arrangement, it is already possible to decorrelate the emitter elements and the sensor elements from one another via the distance between the sensor elements. The rotation of the columns or of the rows about an angle α allows the introduction of a further decorrelation component. Alternatively, the angle can also be set based on the rows of sensor elements and emitter elements.

The angle α turns here about a surface normal to the focal-plane array of the units. The planes of the focal-plane arrays of LIDAR transmitting unit and LIDAR receiving unit are advantageously not tilted toward each other as a result. The emitter elements and the sensor elements thus continue to lie on the same plane or on two planes parallel to each other.

The angle α advantageously lies between 0 and 45 degrees, preferably between 2 degrees and 10 degrees.

A particularly advantageous decorrelation is possible in these ranges for providing an optimal illumination of the sensor elements.

A LIDAR receiving unit in accordance with claim 10 is further proposed, said receiving unit being suitable for a LIDAR measurement system according to at least one of the previous embodiments or in accordance with a LIDAR measurement system according to claims 1 to 9.

The previous and subsequent statements regarding the LIDAR receiving unit apply accordingly to the LIDAR receiving unit.

Figure 2:
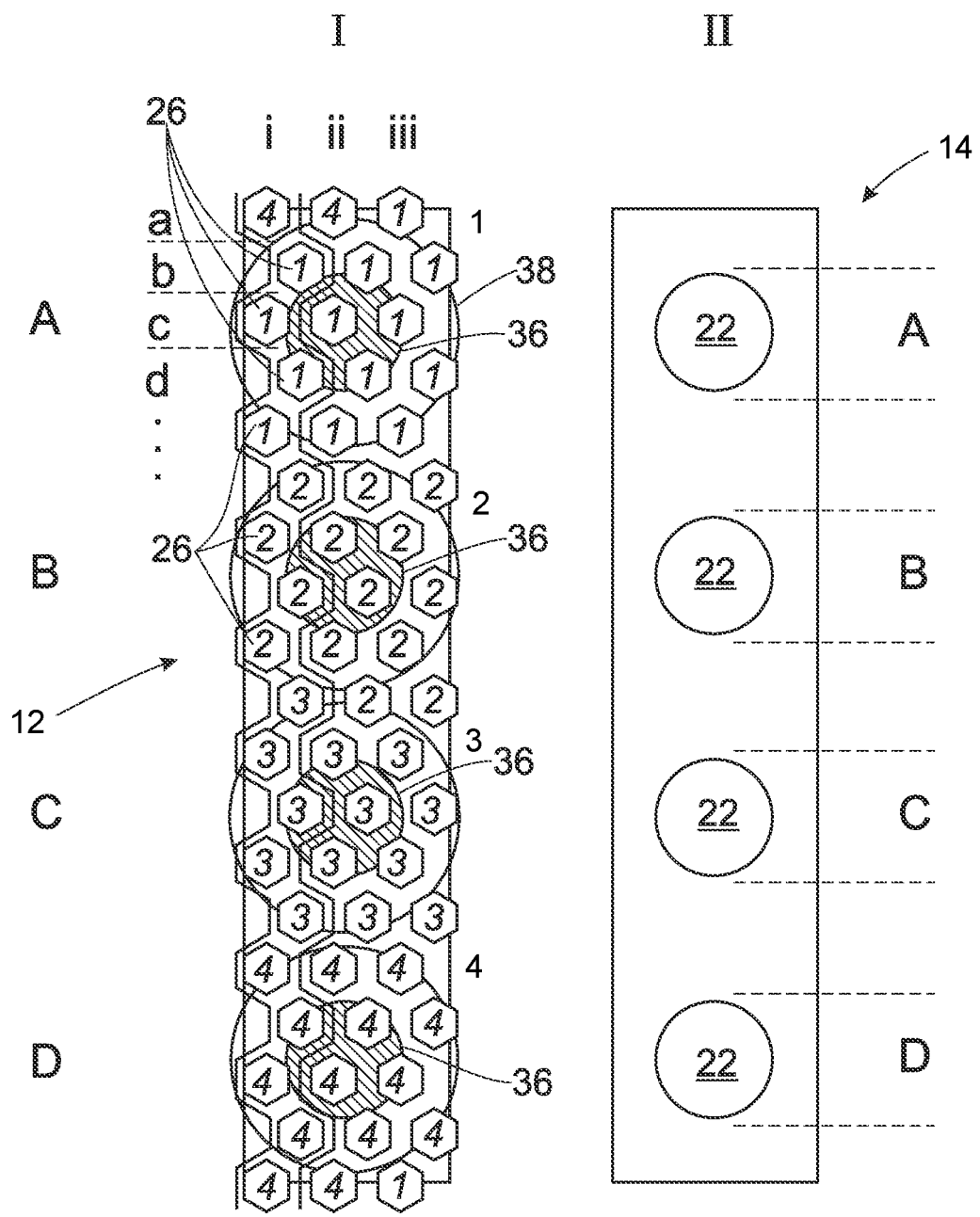
Figure 3:
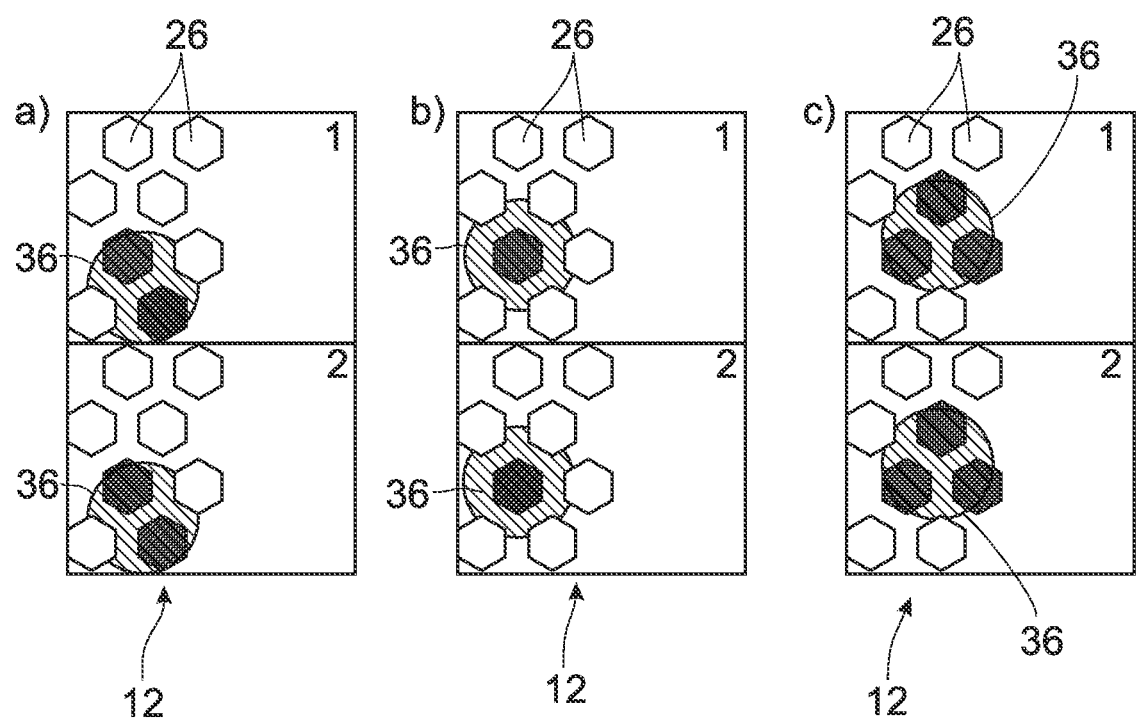
Figure 4:
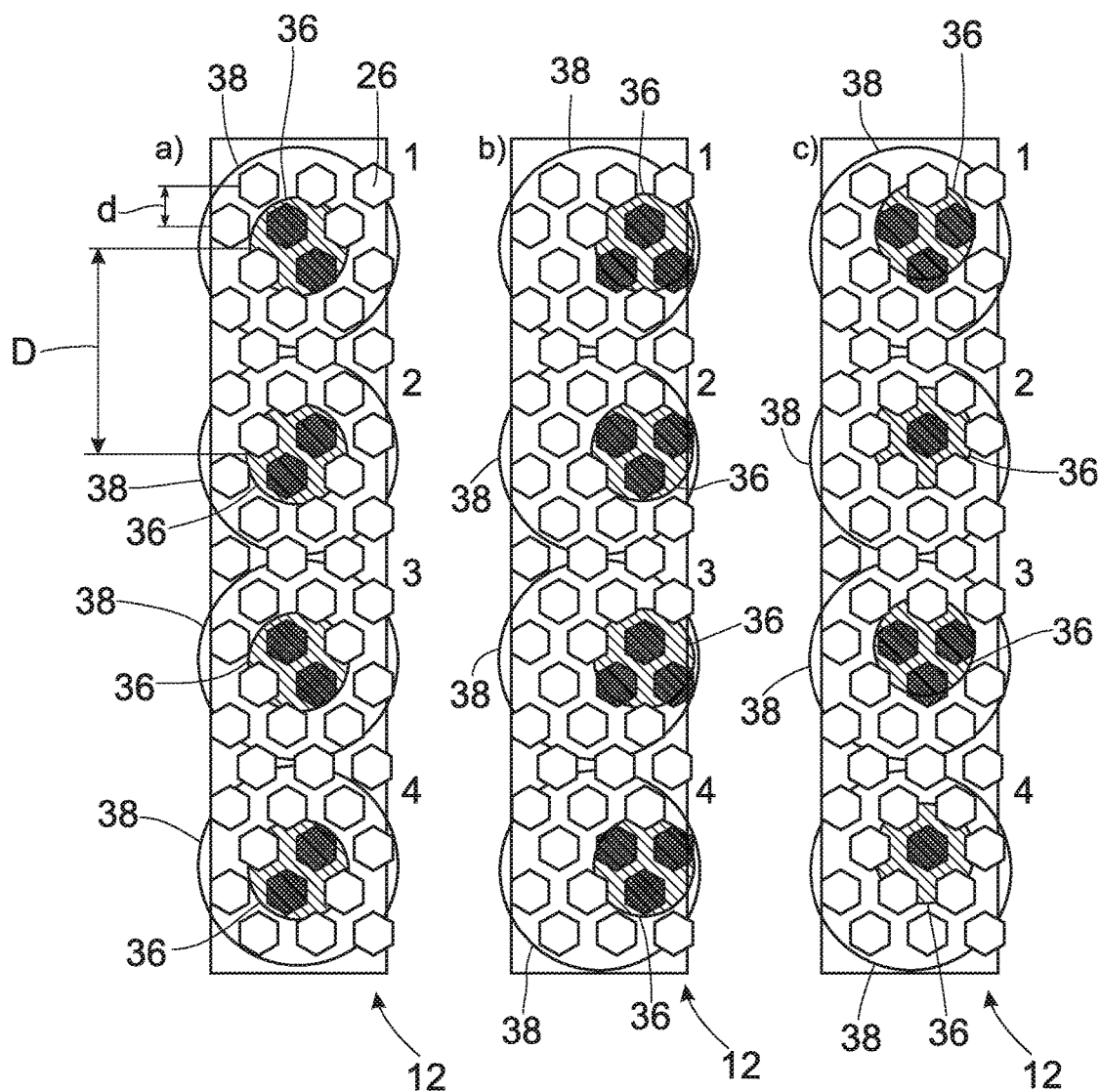
Figure 5:
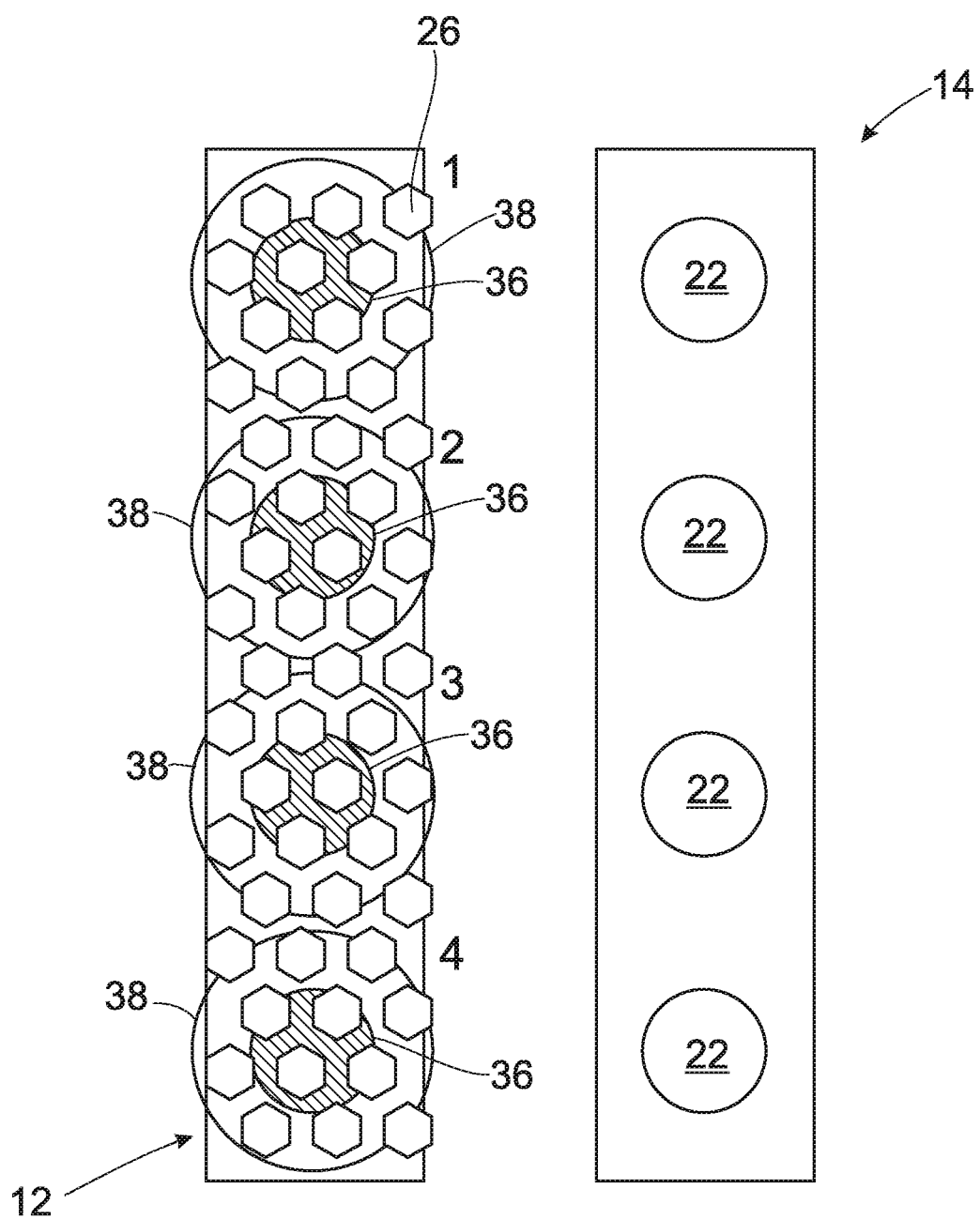
Figure 6:
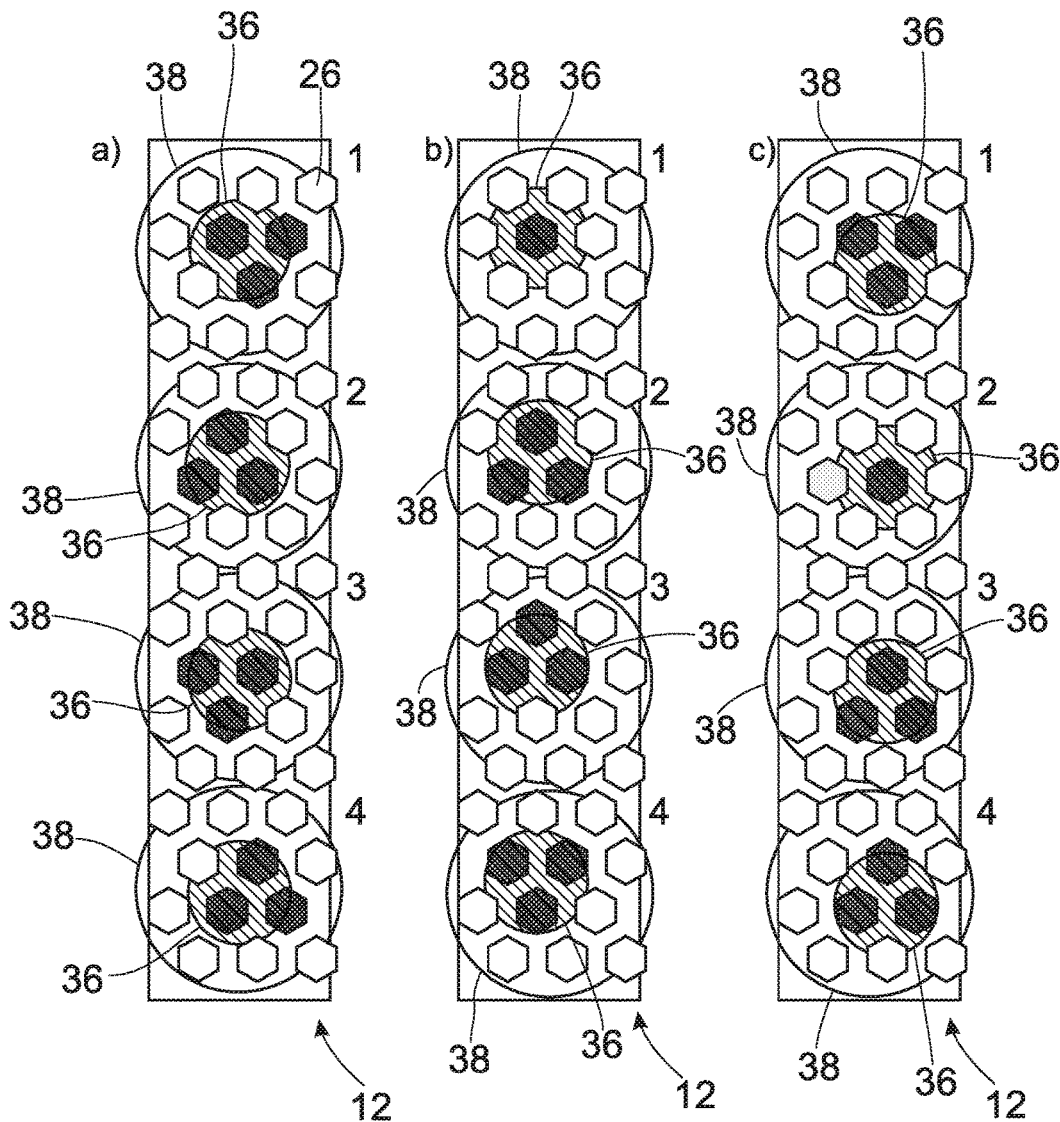
Figure 7:
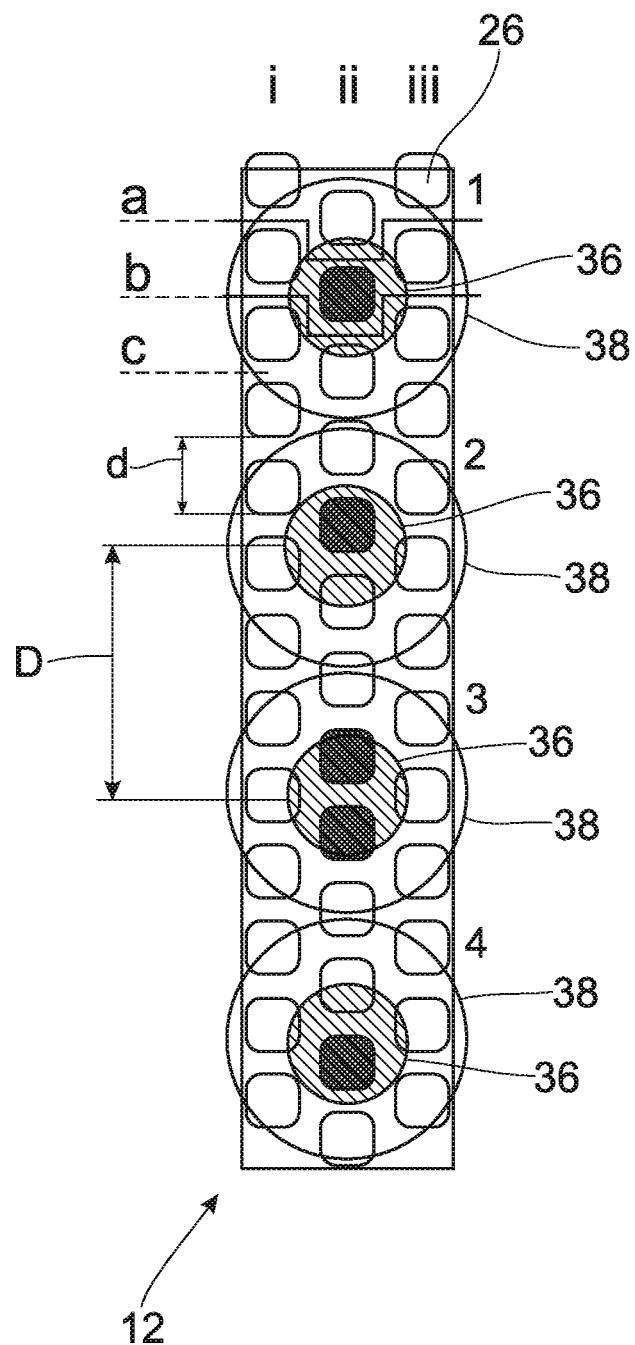
Figure 8:
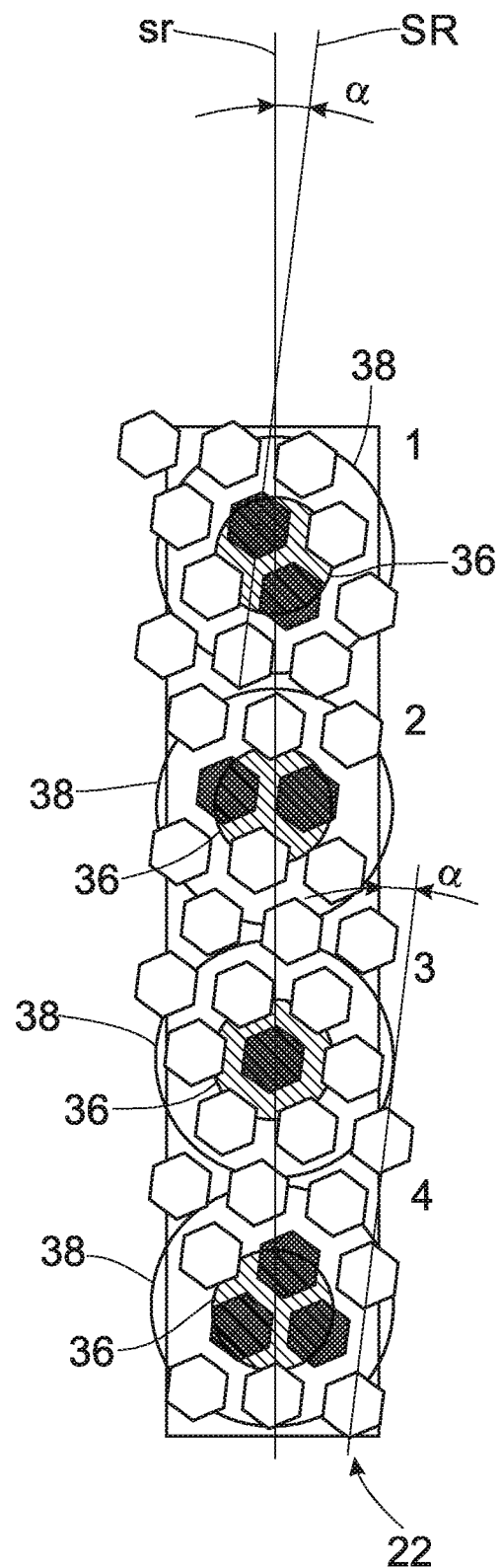

The LIDAR measurement system and the LIDAR receiving unit are explained further in the following for illustrative purposes with the help of several figures. The figures show:

FIG. 1 a schematic representation of a LIDAR measurement system;

FIG. 2 a sectional representation of a LIDAR receiving unit and a LIDAR transmitting unit;

FIG. 3 representation of different mapping possibilities with a correlated LIDAR measurement system;

FIG. 4 first variant of a decorrelated LIDAR measurement system;

FIG. 5 second variant of a decorrelated LIDAR measurement system;

FIG. 6 mapping possibilities of the decorrelated LIDAR measurement system in accordance with FIG. 5;

FIG. 7 third variant of a decorrelated LIDAR measurement system;

FIG. 8 fourth variant of a decorrelated LIDAR measurement system.

In FIG. 1, a LIDAR measurement system 10 with a LIDAR receiving unit 12 and a LIDAR transmitting unit 14 is depicted. The LIDAR measurement system 10 additionally comprises a receiving optic 16 and a transmitting optic 18. This LIDAR measurement system 10 is designed to be mounted statically on a motor vehicle in order to monitor an environment and, in the process, determine the distance and the motion of an object 20 in relation to the motor vehicle. Such a measurement system can be used, for example, for autonomous driving. The operating principle is as follows.

The LIDAR transmitting unit 14 has emitter elements 22, these emitter elements 22 emitting laser light in the form of light pulses. These emitter elements 22 can be formed, for example, by one or more vertical-cavity surface-emitting lasers, VCSELs for short. A pulse 24 emitted by an emitter element 22 passes through the transmitting optic 18, is reflected on an object 20 and guided via a receiving optic 16 to one of a plurality of sensor elements 26. Such a sensor element can be formed, for example, by a single-photon avalanche diode, also called SPAD.

Only one beam 25 illustrating the course of the pulse 24 is depicted in FIG. 1 for the sake of a simple representation. By means of the optics 16 and 18 and the plurality of emitter elements 22 and sensor elements 26, a space can be scanned for objects by the measurement system 10. A given solid angle is ultimately assigned to each emitter element 22 and each sensor element 26 by the corresponding optics 16 and 18. A light pulse 24 detected by a sensor element 26 is read out by a readout element 28 and relayed to an evaluation unit 30, which has, inter alia, a memory element. The time-of-flight principle, also called TOF, is used here for the determination of the distance of the object 20 from the motor vehicle. The emitted pulse is correlated with the time elapsed until arrival at the receiving unit 12, from which the path of the light pulse 24 can be determined. A corresponding coordination of the running processes is realized by the control unit 32. The reading element in this embodiment is formed by a time-to-digital converter, TDC, which fills the memory element, which models a histogram. These explanations are, however, very basic and are only designed to illustrate the general principle. This embodiment is in no way limiting for the electronic structure of the measurement system. In order to avoid expanding the framework of this document excessively, not all interactions between the respective electronic components and their precise structure can be depicted and explained. The LIDAR measurement system is connected to further components of the motor vehicle via a connection 34, via which the corresponding data can be transmitted.

FIG. 2 shows a sectional top-view depiction of the LIDAR receiving unit 12 and the associated section of the LIDAR transmitting unit 14. The depicted emitter elements 22 map accordingly onto the depicted section of the receiving unit 12.

The receiving unit in this representation has four macrocells 1,2,3,4, which are associated with the four emitter elements 22. The actual mapping of the respective emitter elements 22 onto the receiving unit 12 is illustrated by a circle 36. The latter represents in FIG. 2 the theoretical mapping position of the emitter elements 22 onto the receiving unit 12, it being assumed for this purpose that the laser light 36 is reflected on an object at infinity or at a maximum detection range and impinges the receiving unit 12. The circle 36 is shaded in the representation.

A plurality of sensor elements 26 are associated with each emitter element 22, only a portion of the sensor elements 26 being provided with a reference numeral here in order to ensure a clear representation. The emitter element 22 is larger than the sensor element 26, whereby the laser light 36 illuminates or can illuminate a plurality of sensor elements 26.

A possible deviation of the incoming laser light, for example due to optical effects or other effects such as ageing effects, is indicated by a circle 38, within which the incoming laser light 36 can move. The sensor elements 26 can be activated individually and accordingly also deactivated individually so that sensor elements 26 that are not illuminated are deactivated in order to reduce a detection of environmental radiation.

The sensor elements are combined into macrocells 1,2,3, 4, wherein a macro cell 1,2,3,4 and an emitter element 22 are associated with each other. This association is illustrated in FIG. 2 by designating each sensor element 26 with a number of the corresponding macrocell 1,2,3,4. An emitter element 22 accordingly only maps onto sensor elements 22 of the respective macrocells 1,2,3,4. The sensor elements 26 with the number 1, which constitute the macrocell 1, are associated with the uppermost emitter element 22; the sensor elements of the macrocell 2 are associated with the emitter element 22 below, etc.

The sensor elements have a hexagonal shape. Their corners are advantageously rounded off. The arrangement of the macrocells, of the emitter elements and of the sensor elements is configured in a row-column form. The columns of emitter elements and macrocells are designated by capital Roman numerals, while the rows are accordingly designated by capital Latin letters. The columns of sensor elements are designated by Roman numerals, in lower case, and the rows of sensor elements are designated by Latin letters, likewise in lower case.

Sensor elements that are adjacent column-wise have an offset oriented in the row direction, whereby a hexagonal shape is achieved. Adjacent sensor elements of the first order and of further odd orders have an offset in the row direction here, while adjacent sensor elements of the second order and of further even orders have no offset relative to one another in the row direction.

FIG. 3 shows a plurality of mapping variants for a correlated LIDAR measurement system. This LIDAR measurement system comprises, for instance, four rows of sensor elements 26 per emitter element or macrocell. The incoming laser light of an emitter element 22 is also illustrated here by the circle 36. The sensor elements 26 can be activated as well as deactivated individually, while only the active sensor elements 26 transmit measurement values to the electronic evaluation system.

Sensor elements 26 of which merely a small portion of the detection surface area is illuminated cause a disproportionately large increase in detected environmental radiation relative to the measurable laser light that was actively sent out by an emitter element 22. Active sensor elements 26 are shaded in the representation, while inactive sensor elements 26 are depicted as hexagonal outlines.

The correlation of the LIDAR measurement system 10 is clearly visible in FIG. 3. A comparison of the incoming laser light 36 of macrocell 1 and macrocell 2 reveals that said light maps onto the sensor elements 26 on the macrocells in an identical manner. This is valid for FIG. 3a, which represents the theoretical position of the mapping of the LIDAR transmitting unit 14 onto the LIDAR receiving unit 12; for FIG. 3b, which depicts the worst possible deflection of the incoming laser light 24; as well as for FIG. 3c, which shows the best possible deflection for the incoming laser light.

In FIG. 3a, two sensor elements 26 are almost completely illuminated. It is typically worth activating a sensor element when the latter has an illuminated surface area of over 50 percent. The sensor elements 26, only a small portion of which is illuminated in FIG. 3a, are thus deactivated. In FIG. 3b, the worst-case scenario, although six sensor elements are hit by the laser light 24, only one sensor element 26 is illuminated sufficiently. In comparison with the illumination of FIG. 1, the ratio of measurement signal to background noise is thus adversely reduced. Moreover, the activation of the further five sensor elements 26, only a small portion of which is illuminated, would cause a degradation of the measurement signal relative to a noise background.

The best possible shift of the laser light 24 is depicted in FIG. 3c, in which three sensor elements 26 are illuminated sufficiently, i.e. with a surface area of over 50 percent. FIGS. 3a to 3c illustrate corresponding deflections of the laser light 36, which are caused, for example, by optical mapping errors.

In the described correlated LIDAR measurement system, corresponding deflections lead to a significant improvement or to a significant degradation of detection capability. This problem is to be avoided also in light of the dispersion in the manufacturing process and on economic grounds.

The reason for such an even shift is, inter alia, that with optics, i.e. with the receiving optic 16 and the transmitting optic 18, typical production inaccuracies can occur, which cause a slight deflection of the outgoing or of the incoming laser light. Such mapping errors are substantially identical for certain areas of the optics or at least correlated for certain areas. Due to the small distance of the sensor elements to one another, optical mapping errors for these sensor elements lying close together are correlated with one another. This means that a shift due to an optical mapping error shifts the laser light 36 essentially in an identical manner for adjacent macrocells. If a bad area of a macrocell is now hit in a correlated LIDAR measurement system, then this is bad for all macrocells in this area. Such an effect is to be avoided by means of the following realizations of a decorrelated LIDAR measurement system.

In FIG. 4, a decorrelated LIDAR measurement system 10 is depicted. A LIDAR receiving unit 12 with four macrocells 1,2,3,4, which are associated with four emitter elements 22, is also represented here merely in sections for the LIDAR measurement system 10. Representative of the emitter elements 22, the incoming laser light 36 is depicted, as well as the circle 38 representing the possible border areas for the laser light 36.

FIG. 4a also shows the theoretical mapping onto the LIDAR receiving unit after reflection of the laser light 36 on an object in the infinity or at a maximum detection range. FIG. 4b shows the best possible mapping of the laser light 36 onto the LIDAR receiving unit and FIG. 4c shows the worst possible variant. A table is also associated with the respective figures, the table illustrating a corresponding illumination of the individual macrocells 1,2,3,4 and their sensor elements 26.

The illumination of the sensor elements 26 is represented in the table under FIGS. 4a, 4b and 4c, respectively, in numeric values. These numeric values correspond to a proportion of the surface area of the sensor element 26 illuminated by the laser light. The value 1 corresponds to an illumination of the entire surface area, 0.5 to an illuminated surface area of 50% and 0 to an illuminated surface area of 0%. As mentioned above, only sensor elements 26 are activated for which a surface area of over 50% is illuminated by the laser light. The active sensor elements 26 are also shaded in this representation, the illuminated surface areas of the active sensor elements 26 being added together for each macrocell 1,2,3,4. In FIG. 4, the arrangement of the sensor elements 26 within the circle 38 of adjacent macrocells 1,2,3,4 is varied. A deflection of the laser light 36 has different effects for different macrocells 1,2,3,4. This is also recognizable in FIG. 4a in which the laser light 36 hits two different arrangement variants of the sensor elements 26 in adjacent macrocells 1,2,3,4. The arrangement of the sensor elements 26 is repeated every second macrocell 1,2,3,4. The odd macrocells 1,3 and the even macrocells 2,4 respectively have the same illumination pattern.

In particular, two sensor elements 26 are respectively completely illuminated per macrocell 1,2,3,4 in the standard position according to FIG. 4a, which leads to an overall illumination of 8.0. In FIG. 4b, which depicts the best possible shift of the laser light 36, respectively three sensor elements are active per macrocell, which results in an overall illumination of 11.4. In FIG. 4c, the worst possible position for an illumination by the emitter elements 22 is depicted. Three sensor elements 26 are respectively almost entirely illuminated in the macrocell 1 and in the macrocell 3, while merely one sensor element 26 is active and illuminated in the macrocells 2 and 4. The overall illumination is, however, nevertheless 7.9, which is below the theoretical mapping by merely 0.1. By means of the decorrelation, a sufficient illumination is guaranteed at all times, even in the event of occurrences of deflections of the laser light 36.

The decorrelation of the example shown in FIG. 4 is achieved through the use of 19 rows of sensor elements, which are assigned 4 macrocells and 4 emitter elements. The number 19 is not a multiple of the number 4. The number of rows of sensor elements 26 is unequal to a multiple of the number of associated rows of emitter elements. Likewise, the distance D between adjacent emitter elements 22 is not an integer multiple of the distance d between two rows of sensor elements 26. The distances d and D are depicted in FIG. 4a. The variables of the formula in accordance with the above statements in the general description are N=4, M=4 and K=3.

In a further variant according to FIGS. 5 and 6, 17 rows of sensor elements 26 are arranged so as to be associated with four rows of emitter elements 22. FIG. 5 shows the juxtaposition of a section of the LIDAR transmitting unit 14 and a corresponding section of the LIDAR receiving unit 12. The allocation of the macrocells 1,2,3,4 to the emitter elements 22 is clearly depicted here as well.

As a further development of the embodiment according to FIG. 4, each emitter element maps onto a different arrangement of sensor elements here. These arrangements are repeated, for instance, every fourth macrocell.

In FIGS. 6a, 6b and 6c, the three mapping variants are illustrated again. The different numeric values regarding the illumination of each of the macrocells 1,2,3,4 and their active sensor elements 26 illustrate the different illumination patterns again.

Each macrocell 1,2,3,4 experiences its own illumination intensity. In the cases of a theoretical, worst possible and best possible incoming laser light, the variation in the overall illumination intensity is between 8.9 and 9.2. Regardless of the deflection of the laser light as the result of optical mapping errors, the illumination of a group of 4 macrocells leads to a substantially unaltered illumination intensity.

By way of the decorrelation, the LIDAR measurement system 10 is accordingly independent of potential mapping errors of used optics. Manufacturing costs can be reduced by using less expensive optics while maintaining the same functionality.

The solid angle is thus illuminated sufficiently at all times, whereby a reliable detection of objects is achieved. According to FIG. 6, 51 sensor elements 26 are available to implement an optimal illumination and detection. Sensor elements 26 lying outside the theoretical mapping area of the emitter elements can, for example, be omitted during production. As the result of manufacturing processes, however, it is advantageous to simply manufacture them at the same time. Alternatively, these SPADs can also be used as aperture SPADs, which are active in a near range in which a back-reflection effect can occur. Such a back-reflection can be triggered, for example, via a front panel which partially reflects the emitted laser light. The aperture SPADs are adapted accordingly, for example by means of a coating, in order to avoid being triggered by this reflection or to keep the likelihood of such a triggering low.

FIG. 7 shows a further embodiment which uses essentially square sensor elements instead of hexagonal sensor elements. These square sensor elements have rounded corners.

In this example, three columns i, ii, iii and 13 rows are formed across from 4 rows of emitter elements 22. This ratio is also unequal to an integer multiple of the number of rows or the number of emitter elements 22. The distance D between the emitter elements is also not an integer multiple of the distance d between the sensor elements.

The distance is generally defined via a distance from one point of an element to the same point of the adjacent element. This point can be, for example, the centre or an edge of the element in question.

In a row a of the sensor elements 26 of the LIDAR receiving unit 12, a corresponding column offset is depicted for sensor elements 22 adjacent in the row direction. The column ii is shifted by approximately 50 percent downward, i.e. in the column direction or transversely to the row direction. The subsequently adjacent sensor element 26 of the column iii is not shifted vis-à-vis column i.

Sensor elements adjacent row-wise of even order are not shifted with respect to one another; sensor elements adjacent row-wise of uneven order are shifted with respect to one another in the column direction. The illumination structure also differs in this decorrelated LIDAR measurement system 10 for each macrocell.

In FIG. 8, a further variant for a hexagonal pattern is represented. This essentially corresponds to the hexagonal variants according to FIG. 4 or FIGS. 5 and 6 elucidated above. 15 rows of sensor elements 26 are allocated to the four emitter elements 22 on the sensor unit segment. The sensor elements are turned in their hexagonal arrangement about an angle α. The rotation occurs about a normal to the surface area of the focal-plane array. This angle α is, for instance, chosen to be 6.9 degrees. Angles between 0 and 45 degrees are, however, also possible, the angle α preferably lying between 2 and 10 degrees. In particular, the column direction sr of the macrocells 1,2,3,4 or of the sensor elements 26 has the angle α relative to the column direction SR of the emitter elements 22.

The above statements have been made based on a measurement system which illustratively has a transmitting unit as well as a receiving unit arranged to the right of the latter. The arrangement with one above the other or also diagonally to one another is implicitly comprised here as a consequence and does not require a separate description. A rotation of one or both units is also comprised by the foregoing descriptions. The latter can also be the rotation of a chip of a unit.

The invention claimed is:

1. A LIDAR measurement system with a LIDAR transmitting unit and a LIDAR receiving unit, which is configured in a focal-plane-array arrangement, wherein
the LIDAR receiving unit has a plurality of sensor elements and wherein
the LIDAR transmitting unit has a plurality of emitter elements, wherein
a plurality of sensor elements form a macrocell, wherein the macrocell is associated with a single emitter element, wherein the distance between two adjacent emitter elements is unequal to an integer multiple of the distance between two adjacent sensor elements.

2. The LIDAR measurement system according to claim 1, wherein
the emitter elements and the macrocells are respectively arranged apart in a row-column arrangement and wherein
the sensor elements are likewise arranged in a row-column arrangement.

3. The LIDAR measurement system according to claim 1, wherein adjacent sensor elements of an odd order have an offset and adjacent sensor elements of an even order have no offset.

4. The LIDAR measurement system according claim 1, wherein sensor elements that are adjacent column-wise have a row-wise offset.

5. The LIDAR measurement system according to claim 1, wherein sensor elements that are adjacent in the row direction have an offset oriented in the column direction.

6. The LIDAR measurement system according to claim 1, wherein the columns of emitter elements of the LIDAR transmitting unit and the columns of sensor elements of the LIDAR receiving unit are configured so as to be parallel to one another or have an angle α relative to one another.

7. The LIDAR measurement system according to claim 6, wherein in that the angle α lies between 0° and 45°.

8. The LIDAR measurement system with a LIDAR transmitting unit and a LIDAR receiving unit, which is configured in a focal-plane-array arrangement, wherein
the LIDAR receiving unit has a plurality of sensor elements and wherein
the LIDAR transmitting unit has a plurality of emitter elements, wherein
a plurality of sensor elements form a macrocell, wherein the macrocell is associated with a single emitter element, wherein
the emitter elements and the macrocells are respectively arranged apart in a row-column arrangement and wherein
the sensor elements are likewise arranged in a row-column arrangement,
wherein the number of rows of sensor elements (26) of a plurality of adjacent macrocells is unequal to the integer multiple of the associated emitter elements.

9. The LIDAR measurement system according to claim 8, wherein adjacent sensor elements of an odd order have an offset and adjacent sensor elements of an even order have no offset.

10. The LIDAR measurement system according to claim 8, wherein sensor elements that are adjacent column-wise have a row-wise offset.

11. The LIDAR measurement system according to claim 8, wherein sensor elements that are adjacent in the row direction have an offset oriented in the column direction.

12. The LIDAR measurement system according to claim 8, wherein the columns of emitter elements of the LIDAR transmitting unit and the columns of sensor elements of the LIDAR receiving unit are configured so as to be parallel to one another or have an angle α relative to one another.

13. The LIDAR measurement system according to claim 12, wherein the angle α lies between 0° and 45°.

14. The LIDAR measurement system with a LIDAR transmitting unit and a LIDAR receiving unit, which is configured in a focal-plane-array arrangement, wherein
the LIDAR receiving unit has a plurality of sensor elements and wherein
the LIDAR transmitting unit has a plurality of emitter elements, wherein
a plurality of sensor elements form a macrocell, wherein the macrocell is associated with a single emitter element, wherein
the emitter elements and the macrocells are respectively arranged apart in a row-column arrangement and wherein
the sensor elements are likewise arranged in a row-column arrangement, having a number of rows of N emitter elements and associated N macrocells, wherein the number of rows of sensor elements of the N macrocells is determined by $(m \cdot N)+k$, wherein m is an integer and k is an integer between 1 and N−1.

15. The LIDAR measurement system according to claim 14, wherein adjacent sensor elements of an odd order have an offset and adjacent sensor elements of an even order have no offset.

16. The LIDAR measurement system according to claim 14, wherein sensor elements that are adjacent column-wise have a row-wise offset.

17. The LIDAR measurement system according to claim 14, wherein sensor elements that are adjacent in the row direction have an offset oriented in the column direction.

18. The LIDAR measurement system according to claim 14, wherein the columns of emitter elements of the LIDAR transmitting unit and the columns of sensor elements of the LIDAR receiving unit are configured so as to be parallel to one another or have an angle α relative to one another.

19. The LIDAR measurement system according to claim 18, wherein the angle α lies between 0° and 45°.

* * * * *